United States Patent
Bossolo et al.

(10) Patent No.: US 10,774,207 B2
(45) Date of Patent: Sep. 15, 2020

(54) FLUOROELASTOMER COMPOSITION

(71) Applicant: SOLVAY SPECIALTY POLYMERS ITALY S.P.A., Bollate (IT)

(72) Inventors: Stefano Bossolo, Parabiago (IT); Claudia Manzoni, Bologna (IT); Matteo Fantoni, Vanzaghello (IT); Stefano Arrigoni, Bollate (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 35 days.

(21) Appl. No.: 16/319,195

(22) PCT Filed: Jul. 12, 2017

(86) PCT No.: PCT/EP2017/067491
§ 371 (c)(1),
(2) Date: Jan. 18, 2019

(87) PCT Pub. No.: WO2018/015234
PCT Pub. Date: Jan. 25, 2018

(65) Prior Publication Data
US 2019/0276654 A1    Sep. 12, 2019

(30) Foreign Application Priority Data
Jul. 18, 2016 (EP) .................... 16179972

(51) Int. Cl.
| C08L 27/12 | (2006.01) |
| C08K 5/01 | (2006.01) |
| C08K 5/14 | (2006.01) |
| C08K 5/18 | (2006.01) |
| C08K 5/372 | (2006.01) |

(52) U.S. Cl.
CPC ............... *C08L 27/12* (2013.01); *C08K 5/01* (2013.01); *C08K 5/14* (2013.01); *C08K 5/18* (2013.01); *C08K 5/3725* (2013.01)

(58) Field of Classification Search
CPC ... C08K 5/01; C08K 5/18; C08K 5/14; C08K 5/3725; C08L 27/12
See application file for complete search history.

(56) References Cited

U.S. PATENT DOCUMENTS

| 4,035,565 A | 7/1977 | Apotheker et al. |
| 4,243,770 A | 1/1981 | Tatemoto et al. |
| 4,281,092 A | 7/1981 | Breazeale |
| 4,564,662 A | 1/1986 | Albin |
| 4,694,045 A | 9/1987 | Moore |
| 4,943,622 A | 7/1990 | Naraki et al. |
| 5,173,553 A | 12/1992 | Albano et al. |
| 5,447,993 A | 9/1995 | Logothetis |
| 5,789,489 A | 8/1998 | Coughlin et al. |
| 2004/0236028 A1* | 11/2004 | Hung et al. ........... C08F 214/18 525/326.2 |
| 2012/0196974 A1* | 8/2012 | Iwamoto et al. ........ C08K 3/04 524/546 |
| 2015/0073111 A1 | 3/2015 | Hung et al. |

FOREIGN PATENT DOCUMENTS

| EP | 0136596 A2 | 4/1985 |
| EP | 0199138 A2 | 10/1986 |
| EP | 0410351 A1 | 1/1991 |
| EP | 0606883 A1 | 7/1994 |
| EP | 0661304 A1 | 7/1995 |
| WO | 0708797 A1 | 5/1996 |

\* cited by examiner

*Primary Examiner* — Nathan M Nutter

(57) ABSTRACT

The invention pertains to a peroxide/nitrile dual cure fluoroelastomer composition able to provide for cured parts having improved thermal and water vapour resistance, to a method of curing the same and to cured articles obtained therefrom.

20 Claims, No Drawings

FLUOROELASTOMER COMPOSITION

CROSS-REFERENCE TO RELATED APPLICATION

This application is a U.S. national stage entry under 35 U.S.C. § 371 of International Application No. PCT/EP2017/067491 filed Jul. 12, 2017, which claims priority to European application No. EP 16179972.1 filed on Jul. 18, 2016. The entire contents of these applications are explicitly incorporated herein by this reference.

TECHNICAL FIELD

The invention pertains to a fluoroelastomer composition able to provide cured parts having improved thermal and steam resistance. The invention also pertains to a method of curing such fluoroelastomer compositions and to cured articles obtained therefrom.

BACKGROUND ART

Fluoroelastomers, and more specifically perfluoroelastomers, have long been used in a variety of applications that require excellent resistance to high temperature and chemical attack.

To enable crosslinking of these fluoroelastomers, it has been long known to incorporate in the fluoroelastomer polymer chain a small percentage of monomers including nitrile groups. The reactivity of such nitrile groups in the presence of a variety of curing agents, including notably aromatic tetra-amines, di(amino(thio)phenols), and organotin compounds, including tetraalkyl and tetraaryl compounds, is such to provide crosslinking point of supposedly triazine-type or similar structure. The crosslinking chemistry of such nitrile groups possesses high thermal stability—higher than the stability of bridging/crosslinking groups provided by alternative crosslinking chemistry.

For this reason, nitrile-cure site containing fluoroelastomers have been long recognized for their thermal stability; within this area, dual cure approaches have been already pursued in the past for further improving e.g. curing rate.

Notably, U.S. Pat. No. 5,447,993 5 Sep. 1995 discloses nitrile-containing perfluoroelastomers which are cured by a combination of a peroxide, a co-agent, which can be a diene or a triene, and a catalyst causing crosslinks to form using nitrile groups, for achieving faster cure rate, while maintaining good thermal properties in vulcanizates. According to this document, two distinct (chemical) cure processes are believed to take place, one caused by the peroxide and the polyunsaturated co-agent, and the other caused by a catalysed reaction of nitrile groups.

US 2015073111 (E.I. DUPONT DE NEMOURS) 12 Mar. 2015 is directed to certain VDF-based fluoroelastomers comprising secondary cyano-groups, which can be cured using, as curatives, diaminobisphenol AF, ammonia generators such as urea, and free radical systems such as the combination of an organic peroxide with a multifunctional coagent such as triallylisocyanurate.

EP 0606883 A (NIPPON MEKTRON) 20 Jul. 1994 pertains to a composition including a nitrile-containing fluoroelastomer and a bisaminophenol derivative curing agent.

EP 0661304 A (SOLVAY SPECIALTY POLYMERS ITALY SPA) 5 Jul. 1995 is directed to iodine-containing fluoroelastomers comprising recurring units derived from a bis-olefin, which are notably cured via peroxidic route using a combination of a peroxide and curing co-agents, among which triallylisocyanurate is specifically mentioned as preferred, and used in all exemplified embodiments.

In this area, there remains a continuous quest for curable fluoroelastomer compositions able to deliver upon curing even improved thermal and steam resistance.

SUMMARY OF INVENTION

A first object of the invention is hence a fluoroelastomer composition (C) comprising:

at least one fluoroelastomer (A) comprising from 0.1 to 10.0% moles of recurring units derived from at least one monomer (CSM), where the monomer (CSM) is at least one cure-site containing monomer having at least a nitrile group, with respect to total moles of recurring units, and comprising iodine and/or bromine cure sites in an amount such that the I and/or Br content is from 0.04 to 10.0% wt, with respect to the total weight of fluoroelastomer (A);

at least one organic peroxide (O);

at least one bis-olefin (OF) of formula:

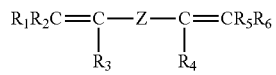

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ (hydro)carbon radical (including alkylene or cycloalkylene radical), optionally containing oxygen atoms, preferably at least partially fluorinated, or a (per)fluoro (poly)oxyalkylene radical comprising one or more catenary ether bonds.

and at least one compound (A) selected from the group consisting of: (A-1) aminophenols (AP), which are bis-amino(thio)phenol compounds of formula:

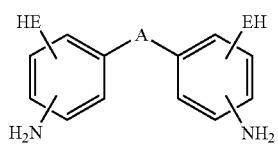

wherein:

A is a bond, —$SO_2$—, —O—, —C(O)—, or a (fluoro)alkyl of 1 to 10 carbon atoms (specifically a perfluoroalkyl of 1 to 10 carbon atoms);

each of E, equal or different at each occurrence, is oxygen or sulphur, preferably oxygen, and wherein the amino and -EH groups are interchangeably in ortho, meta or para positions with respect to the group A;

(A-2) amines (TA), which are aromatic tetraamine compounds of formula:

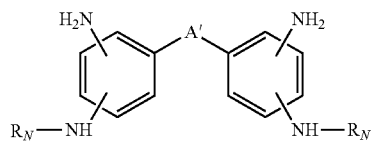

wherein:

A' is a bond, —SO$_2$—, —O—, —C(O)—, (fluoro)alkyl of 1 to 10 carbon atoms (specifically a perfluoroalkyl of 1 to 10 carbon atoms);

each of R$_N$, equal to or different from each other, is a hydrogen atom or a C$_1$-C$_{12}$ hydrocarbon group, preferably an aryl group; and the amino groups are interchangeably in ortho, meta or para positions with respect to the group A'.

The Applicant has surprisingly found that when combining the afore-mentioned dual-cure system, including a compound (A), as above detailed, a peroxide and a bis-olefin, an iodine/bromine containing fluoroelastomer comprising nitrile cure sites can be cured so as to deliver significantly improved steam resistance combined with thermal resistance, specifically substantially improved over performances associated to compounds cured by single "nitrile"-curing and even over performances associated to compounds submitted to dual cure, but in the presence of alternative polyunsaturated compounds.

DETAILED DESCRIPTION OF THE INVENTION

The composition (C) comprises one or more than one compound (A), as above detailed.

The aminophenol (AP) can be selected from the group consisting of 4,4'-[2,2,2-trifluoro-1-(trifluoromethyl)-ethylidene]bis(2-aminophenol); and 4,4'-sulfonylbis(2-aminophenol); the amine (TA) can be selected from the group consisting of 3,3'-diaminobenzidine, 3,3',4,4'-tetraaminobenzophenone and a compound of formula:

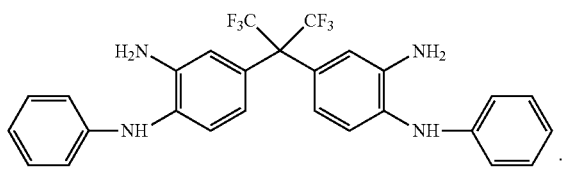 [SMILES: Nc1cc(C(c2ccc(Nc3ccccc3)c(N)c2)(C(F)(F)F)C(F)(F)F)ccc1Nc1ccccc1]

According to certain preferred embodiments, the compound (A) of the composition (C) is at least one aminophenol (AP). According to these embodiments, particularly preferred is 4,4'-[2,2,2-trifluoro-1-(trifluoromethyl)-ethylidene]bis(2-aminophenol), otherwise known as bis-aminophenol AF, having formula:

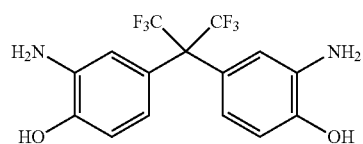 [SMILES: Nc1cc(C(c2ccc(O)c(N)c2)(C(F)(F)F)C(F)(F)F)ccc1O]

The amount of the compound (A) in the composition (C) is generally at least 0.1, preferably at least 0.2, more preferably at least 0.5 and/or generally at most 10 phr, preferably at most 6 phr, more preferably at most 5 phr, relative to 100 weight parts of fluoroelastomer (A).

The bis-olefin (OF) is preferably selected from the group consisting of:

bis-olefins of formula (OE-1):
(OE-1)

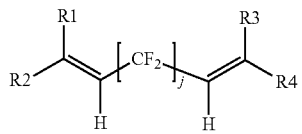

wherein j is an integer between 2 and 10, preferably between 4 and 8, and R$_1$, R$_2$, R$_3$, R$_4$, equal or different from each other, are H, F or C$_{1-5}$ alkyl or (per)fluoroalkyl group;

bis-olefins of formula (OF-2):
(OF-2)

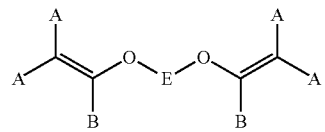

wherein each of A, equal or different from each other and at each occurrence, is independently selected from F, Cl, and H; each of B, equal or different from each other and at each occurrence, is independently selected from F, Cl, H and OR$_B$, wherein R$_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —(CF$_2$)$_m$— group, with m being an integer from 3 to 5; a preferred bis-olefin of (OF-2) type is F$_2$C=CF—O—(CF$_2$)$_5$—O—CF=CF$_2$;

bis-olefins of formula (OF-3):
(OE-3)

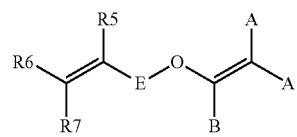

wherein E, A and B have the same meaning as above defined; R$_5$, R$_6$, R$_7$, equal or different from each other, are H, F or C$_{1-5}$ alkyl or (per)fluoroalkyl group.

Bis-olefins (OF) which have been found particularly effective are those of type (OE-1) as above detailed, and more specifically particularly good results have been obtained with a bis-olefin (OF) of formula: CH$_2$=CH—(CF$_2$)$_6$—CH=CH$_2$.

The amount of bis-olefin (OF) in the composition (C) is generally at least 0.1, preferably at least 0.2, more preferably at least 0.5 and/or generally at most 10 phr, preferably at most 6 phr, more preferably at most 5 phr, relative to 100 weight parts of fluoroelastomer (A).

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, a (per)fluorinated monomer) and, optionally, recurring units derived from at least one ethylenically unsaturated monomer free from fluorine atom (hereafter, a hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Generally fluoroelastomer (A) comprises recurring units derived from at least one (per)fluorinated monomer, in addition to recurring units derived from the monomer (CSM), as above detailed, wherein said (per)fluorinated monomer is generally selected from the group consisting of:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride; 1,2-difluoroethylene, vinylidene fluoride (VDF) and trifluoroethylene (TrFE);

(per)fluoroalkylethylenes complying with formula $CH_2$=$CH$—$R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_5$, or —$C_3F_7$;

hydrofluoroalkylvinylethers complying with formula $CH_2$=$CFOR_{f1}$ in which $R_{f1}$ is a $C_1$-$C_6$ fluoro- or perfluoroalkyl, e.g. —$CF_3$, —$C_2F_5$, or —$C_3F_7$;

fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups; in particular (per)fluoro-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, or —$C_3F_7$, or a $C_1$-$C_6$ (per)fluorooxyalkyl having one or more ether groups, like —$C_2F_5$—O—$CF_3$;

functional fluoro-alkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

(per)fluorodioxoles, of formula:

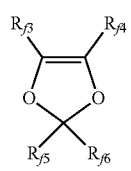

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, or —$OCF_2CF_2OCF_3$.

Examples of hydrogenated monomers are notably hydrogenated alpha-olefins, including ethylene, propylene, 1-butene, diene monomers, styrene monomers, with alpha-olefins being typically used.

Fluoroelastomers (A) are, in general, amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:

(1) VDF-based copolymers, in which VDF is copolymerized with the monomer (CSM), as above detailed, and at least one additional comonomer selected from the group consisting of:

(a) $C_2$-$C_8$ perfluoroolefins, such as tetrafluoroethylene (TFE), hexafluoropropylene (HFP);

(b) hydrogen-containing $C_2$-$C_8$ olefins, such as vinyl fluoride (VF), trifluoroethylene (TrFE), hexafluoroisobutene (HFIB), perfluoroalkyl ethylenes of formula $CH_2$=$CH$—$R_f$, wherein $R_f$ is a $C_1$-$C_6$ perfluoroalkyl group;

(c) $C_2$-$C_8$ fluoroolefins comprising at least one of iodine, chlorine and bromine, such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, preferably $CF_3$, $C_2F_5$, or $C_3F_7$;

(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

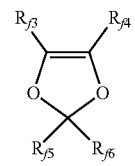

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom, such as notably —$CF_3$, —$C_2F_5$, —$C_3F_7$, —$OCF_3$, or —$OCF_2CF_2OCF_3$; preferably, perfluorodioxoles;

(g) (per)fluoro-methoxy-vinylethers (MOVE, hereinafter) having formula: $CF_2$=$CFOCF_2O_{f2}$
wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom; $R_{f2}$ is preferably —$CF_2CF_3$ (MOVE1); —$CF_2CF_2OCF_3$ (MOVE2); or —$CF_3$ (MOVE3);

(h) $C_2$-$C_8$ non-fluorinated olefins (01), for example ethylene and propylene; and (2) TFE-based copolymers, in which TFE is copolymerized with the monomer (CSM), as above detailed, and at least one additional comonomer selected from the group consisting of (c), (d), (e), (g), (h) and (i) as above detailed.

Fluoroelastomer (A) is generally selected among TFE-based copolymers, as above detailed.

Optionally, fluoroelastomer (A) of the present invention may also comprises recurring units derived from a bis-olefin (OF), as above detailed.

Among the cure-site containing monomers of type (CSM), as above detailed, comprised in fluoroelastomer (A), preferred monomers are (per)fluorinated and are especially those selected from the group consisting of:

(CSM-1) perfluorovinyl ethers containing nitrile groups of formula $CF_2=CF-(OCF_2CFX^{CN})_m-O-(CF_2)_n-CN$, with $X^{CN}$ being F or $CF_3$, m being 0, 1, 2, 3 or 4; n being an integer from 1 to 12;

(CSM-2) perfluorovinyl ethers containing nitrile groups of formula $CF_2=CF-(OCF_2CFX^{CN})_{m'}-O-CF_2-CF(CF_3)-CN$, with $X^{CN}$ being F or $CF_3$, m' being 0, 1, 2, 3 or 4.

Specific examples of cure-site containing monomers of type CSM-1 and CSM-2 suitable to the purposes of the present invention are notably those described in U.S. Pat. No. 4,281,092 (DU PONT) 28 Jul. 1981, U.S. Pat. No. 5,447,993 (DU PONT) 5 Sep. 1995 and U.S. Pat. No. 5,789,489 (DU PONT) 4 Aug. 1998.

A preferred cure-site monomer is perfluoro(8-cyano-5-methyl-3,6-dioxa-1-octene) of formula: $CF_2=CF-O-CF_2-CF(CF_3)-O-CF_2-CF_2-CN$ (8-CNVE).

As said, fluoroelastomer (A) comprises iodine and/or bromine cure sites.

These iodine and/or bromine cure sites may be pendant groups bound to the backbone of the fluoroelastomer (A) polymer chain or may be terminal groups of said polymer chain.

According to a first embodiment, the iodine and/or bromine cure sites are pendant groups bound to the backbone of the fluoroelastomer (A) polymer chain. The fluoroelastomer (A) according to this embodiment typically comprises recurring units derived from brominated and/or iodinated cure-site comonomers selected from:

bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987;

iodo and/or bromo fluoroalkyl vinyl ethers (as notably described in U.S. Pat. No. 4,564,662 (MINNESOTA MINING) 14 Jan. 1986 and EP 199138 A (DAIKIN IND LTD) 29 Oct. 1986).

According to a second preferred embodiment, the iodine and/or bromine cure sites (preferably iodine cure sites) are terminal groups of the fluoroelastomer (A) polymer chain. The fluoroelastomer according to this embodiment is generally obtained by addition to the polymerization medium during fluoroelastomer (A) manufacture of at least one of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and alkali metal or alkaline-earth metal iodides and/or bromides, such as described notably in U.S. Pat. No. 5,173,553 (AUSIMONT SRL) 22 Dec. 1992.

Advantageously, for ensuring acceptable reactivity it is generally understood that the content of iodine and/or bromine in the fluoroelastomer (A) should be at least 0.05% wt, preferably at least 0.06% weight, with respect to the total weight of fluoroelastomer (A).

On the other side, amounts of iodine and/or bromine not exceeding preferably 7% wt, more specifically not exceeding 5% wt, or even not exceeding 4% wt, with respect to the total weight of fluoroelastomer (A), are those generally selected for avoiding side reactions and/or detrimental effects on thermal stability.

Exemplary fluoroelastomers (A) which can be used in the composition of the present invention are those having iodine cure sites which are terminal groups and having the following composition of monomers (in mol %, with respect to the total moles of recurring units):

(i) tetrafluoroethylene (TFE): 50-80%; (per)fluoroalkylvinylethers (PAVE): 15-50%; monomer (CSM): 0.1-10%; bis-olefin (OF): 0-5%;

(ii) tetrafluoroethylene (TFE): 20-70%; (per)fluoromethoxy-vinylethers (MOVE): 25-75%; (per)fluoroalkylvinylethers (PAVE): 0-50%; monomer (CSM) 0.1-10%; bis-olefin (OF): 0-5%.

The composition (C) further comprises at least an organic peroxide (O); the choice of said peroxide (O) is not particularly critical, provided that the same is capable of generating radicals by thermal decomposition. Among most commonly used peroxides, mention can be made of di(alkyl/alryl) peroxides, including for instance di-tert-butyl peroxide, 2,5-dimethyl-2,5-bis(tert-butylperoxy)hexane, di(t-butylperoxyisopropyl)benzene, dicumyl peroxide; diacyl peroxides, including dibenzoyl peroxide, disuccinic acid peroxide, di(4-methylbenzoyl)peroxide, di(2,4-dichlorobenzoyl)peroxide, dilauroyl peroxide, decanoyl peroxide; percarboxylic acids and esters, including di-tert-butyl perbenzoate, t-butylperoxy-2-ethylhexanoate, 1,1,3,3-tetramethylethylbutyl peroxy-2-ethylhexanoate, 2,5-dimethyl-2,5-di(2-ethylhexanoylperoxy)hexane; peroxycarbonates including notably di(4-t-butylcyclohexyl)peroxydicarbonate, di(2-phenoxyethyl)peroxydicarbonate, bis[1,3-dimethyl-3-(tert-butylperoxy)butyl]carbonate, t-hexylperoxyisoproprylcarbonate, t-butylperoxyisopropylcarbonate. Other suitable peroxide systems are those described, notably, in patent applications EP 136596 A (MONTEDISON SPA) 10 Apr. 1985 and EP 410351 A (AUSIMONT SRL) 30 Jan. 1991, whose content is hereby incorporated by reference.

A person of ordinary skill in the art is capable of choosing the most appropriate peroxide for the necessary or desired curing conditions (e.g., time, temperature) based, for example, on the ten-hours half time temperature of the peroxide (O).

The amount of peroxide (O) in the composition (C) is generally 0.1 to 5 phr, preferably 0.2 to 4 phr, relative to 100 weight parts of fluoroelastomer (A).

The composition (C) may further additionally comprise ingredients which maybe commonly used for the peroxide curing of fluoroelastomers; more specifically, the composition (C) may generally further comprise (a) one or more than one metallic basic compound, in amounts generally from 0.5 to 15 phr, and preferably from 1 to 10 phr, relative to 100 weight parts of fluoroelastomer (A); metallic basic compounds are generally selected from the group consisting of (j) oxides or hydroxides of divalent metals, for instance oxides or hydroxides of Mg, Zn, Ca or Pb, and (jj) metal salts of a weak acid, for instance Ba, Na, K, Pb, Ca stearates, benzoates, carbonates, oxalates or phosphites;

(b) one or more than one acid acceptor which is not a metallic basic compound, in amounts generally from 0.5 to 15 phr, and preferably from 1 to 10 phr, relative to 100 weight parts of fluoroelastomer (A); these acid acceptors are generally selected from nitrogen-containing organic compounds, such as 1,8-bis(dimethylamino)naphthalene, octadecylamine, etc., as notably described in EP 708797 A (DU PONT) 1 May 1996;

(c) other conventional additives, such as fillers, thickeners, pigments, antioxidants, stabilizers, processing aids, and the like.

The invention also pertains to a method for fabricating shaped articles comprising curing the composition (C), as above described.

The composition (C) can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomeric uncured composition into a finished article made of non-tacky, strong, insoluble, chemically and thermally resistant cured fluoroelastomer material.

In addition, the invention pertains to cured articles obtained from the composition (C), as above detailed. Said cured articles are generally obtained by moulding and curing the fluoroelastomer composition, as above detailed. These cured articles may be sealing articles, including O(square)-rings, packings, gaskets, diaphragms, shaft seals, valve stem seals, piston rings, crankshaft seals, cam shaft seals, and oil seals or maybe piping and tubings, in particular flexible hoses or other items, including conduits for delivery of hydrocarbon fluids and fuels.

Cured articles obtained from the composition (C), thanks to their outstanding thermal and water vapour resistance, are suitable for use in fields of endeavour where extremely demanding conditions of use are combined with exposure to water vapour, e.g. for use in the oil and gas market as seals, components and sealing elements, gaskets, hoses, and tubing.

Further in addition, the invention pertains to a method for processing the composition (C), as above detailed, according any of injection moulding, compression moulding, extrusion moulding, coating, screen printing technique, and/or form-in-place technique.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Manufacture of Nitrile-Containing Fluoroelastomer

Example 1

In a 5 litre reactor equipped with a mechanical stirrer operating at 630 rpm, 3.1 l of demineralized water and 31 ml of a microemulsion, previously obtained by mixing 7.4 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 1.9 ml of a 30% v/v NH4OH aqueous solution, 17.4 ml of demineralised water and 4.3 ml of GALDEN® D02 perfluoropolyether of formula: $CF_3O(CF_2CF(CF_3)O)_n(CF_2O)_mCF_3$ with n/m=20, having average molecular weight of 450, were introduced.

Then 2.5 g of 1,4-diiodoperfluorobutane ($C_4F_8I_2$) as chain transfer agent were introduced, and the reactor was heated and maintained at a set-point temperature of 80° C.; a mixture of tetrafluoroethylene (TFE) (38% moles) and perfluoromethylvinylether (MVE) (62% moles) was then added to reach a final pressure of 21 bar (2.1 MPa). 0.31 g of ammonium persulfate (APS) as initiator were then introduced. Pressure was maintained at set-point of 21 bar by continuous feeding of a gaseous mixture of TFE (60% moles) and MVE (40% moles) up to a total of 1350 g, and 129 g of 8-CNVE in 20 portions each 5% increase in conversion, starting from the beginning of the polymerization, were fed to the reactor. Moreover, 0.16 g of APS at 15%, 40% and 55% conversion of gaseous mixture, were introduced. Then the reactor was cooled, vented and the latex recovered. The latex was coagulated with nitric acid as a coagulation agent, and the polymer separated from the aqueous phase, washed with demineralised water and dried in a convection oven at 120° C. for 24 hours. The composition of the obtained polymer from NMR analysis was found to be: TFE 64.6% mol, MVE 34.2% mol, 8-CNVE 1.2% mol, and the Mooney viscosity at 121° C. is 64 MU.

General Compounding and Curing Procedure

The fluoroelastomer of Ex. 1 was compounded with the ingredients as detailed below in a two roll open mill. Plaques were cured in a pressed mould and then post-treated in an air circulating oven in conditions detailed in Table below.

Cure behaviour was characterized by Moving Die Rheometer (MDR), in conditions as specified below, by determining the following properties:

$M_L$=Minimum torque (lb×in)
$M_H$=Maximum torque (lb×in)
$t_{S2}$=Scorch time, time for two units rise from $M_L$ (sec);
$t_{02}$=Time to 2% state of cure (sec);
$t_{50}$=Time to 50% state of cure (sec);
$t_{90}$=Time to 90% state of cure (sec);
$t_{95}$=Time to 95% state of cure (sec).

The tensile properties have been determined on specimens punched out from the plaques, according to the ASTM D 412 C Standard, after post-cure and after exposure to overheated water vapour at 220° C. or 250° C.

TS is the tensile strength in MPa;
$M_{100}$ is the modulus in MPa at an elongation of 100%;
E.B. is the elongation at break in %.

Variation of properties (including weight change, volume swell and mechanical properties) upon exposure to steam are recollected as percentage over the corresponding values of the properties as determined on cured sample after post-cure.

The value "specimens destroyed" ("D" in table 3, herein below) means specimen was destroyed upon exposure, so that no meaningful determination was possible.

Compression set (CS) values have been determined on O-rings (#214 class) according to the ASTM D 395-B method at temperatures ranging from 200° C. to 300° C.; values in the table are the average of determinations made on 4 specimens.

Curing recipe and conditions and properties of cured sample, before and after exposure to water vapour at 220° C. or 250° C. are summarized, respectively, in tables 1 to 3.

TABLE 1

| Ingredient | | Ex. 1C | Ex. 2 | Ex. 3 | Ex. 4C |
|---|---|---|---|---|---|
| FKM from Ex. 1 | Wt parts | 100 | 100 | 100 | 100 |
| BOAP(*) | phr | 2.00 | 2.00 | 1.00 | 2.00 |
| Bis-Olefin(#) | phr | | 0.75 | 0.75 | |

TABLE 1-continued

| Ingredient | | Ex. 1C | Ex. 2 | Ex. 3 | Ex. 4C |
|---|---|---|---|---|---|
| Peroxide$^{(\$)}$ | phr | | 0.50 | 0.50 | 0.50 |
| C-black$^{(^)}$ | phr | 20.00 | 20.00 | 20.00 | 20.00 |
| TAIC$^{(\S)}$ | phr | | | | 0.70 |

$^{(*)}$BOAP: bis-aminophenol AF, commercially available from Apollo Scientific;
$^{(\#)}$Bis-Olefin: of formula $CH_2=CH-(CF_2)_6-CH=CH_2$;
$^{(\$)}$Peroxide: neat 2,5-dimethyl-2,5-di-t-butyl-peroxy-hexane, commercially available from Arkema under tradename Luperox® 101;
$^{(\S)}$TAIC: Triallyl isocyanurate (75%) dispersion in silica, commercially available as Drimix TAIC 75 from Finco.

TABLE 2

| Sample | | Ex. 1C | Ex. 2 | Ex. 3 | Ex. 4C |
|---|---|---|---|---|---|
| $M_L$ | (Nxm) | 1.0 | 0.9 | 0.8 | 0.3 |
| $M_H$ | (Nxm) | 18.7 | 17.7 | 15.8 | 23.8 |
| $t_{s2}$ | (s) | 230.0 | 166.0 | 122.0 | 104.0 |
| $t_{02}$ | (s) | 92.0 | 71.0 | 51.0 | 65.0 |
| $t_{50}$ | (s) | 443.0 | 404.0 | 336.0 | 535.0 |
| $t_{90}$ | (s) | 678.0 | 635.0 | 569.0 | 1182.0 |
| $t_{95}$ | (s) | 731.0 | 677.0 | 610.0 | 1337.0 |
| Molding Conditions | | | | | |
| Time and T in the press | | 10 min at 170° C. | 10 min at 170° C. | 10 min at 170° C. | 10 min at 170° C. |
| Post-cure conditions | | | | | |
| In air oven | | (8 + 16 h) at 290° C. | (8 + 16 h) at 290° C. | (8 + 16 h) at 290° C. | (8 + 16 h) at 290° C. |

TABLE 3

| Property | | Ex. 1C | Ex. 2 | Ex. 3 | Ex. 4C |
|---|---|---|---|---|---|
| Properties after post-cure | | | | | |
| TS | (MPa) | 13.9 | 14.2 | 13.8 | 14.3 |
| $M_{100}$ | (MPa) | 9.8 | 8.5 | 7.6 | 10.2 |
| E.B. | (%) | 117 | 126 | 131 | 120 |
| CS (70 h at 200° C.) | (%) | 6 | 9 | 13 | 12 |
| CS (70 h at 300° C.) | (%) | D | 29 | 28 | 30 |
| CS (70 h at 315° C.) | (%) | D | D | 42 | D |
| After exposure to steam at 220° C. for 168 hours | | | | | |
| ΔTS | (%) | D | −27 | −6 | −49 |
| Δ$M_{100}$ | (%) | D | −34 | −14 | −67 |
| ΔE.B. | (%) | D | 45 | 1 | 165 |
| Δweight | (%) | D | −0.2 | 0.9 | 0.3 |
| Δvolume | (%) | D | 0.0 | 1.7 | 0.7 |
| After exposure to steam at 250° C. for 168 hours | | | | | |
| ΔTS | (%) | D | −48 | −33 | −63 |
| Δ$M_{100}$ | (%) | D | −56 | −24 | −74 |
| ΔE.B. | (%) | D | 87 | 9 | 214 |
| Δweight | (%) | D | −0.4 | 0.4 | 0.3 |
| Δweight | (%) | D | 0.0 | 0.7 | 0.7 |

The invention claimed is:

1. A fluoroelastomer composition (C) comprising:
at least one fluoroelastomer (A) comprising from 0.1 to 10.0% moles of recurring units derived from at least one monomer (CSM), wherein the monomer (CSM) is a cure-site containing monomer having at least one nitrile group, with respect to total moles of recurring units, and comprising iodine and/or bromine cure sites in an amount such that the I and/or Br content is from 0.04 to 10.0% wt, with respect to the total weight of fluoroelastomer (A);
at least one organic peroxide (O);
at least one bis-olefin (OF) of formula:

$$R_1R_2C=C(R_3)-Z-C(R_4)=CR_5R_6$$

wherein $R_1$, $R_2$, $R_3$, $R_4$, $R_5$ and $R_6$, equal or different from each other, are each independently H or $C_1$-$C_5$ alkyl; Z is a linear or branched $C_1$-$C_{18}$ (hydro)carbon radical, optionally containing oxygen atoms, and optionally at least partially fluorinated, or a (per)fluoro(poly)oxyalkylene radical comprising one or more catenary ether bonds;
and
at least one compound (A) selected from the group consisting of:
(A-1) aminophenols (AP), wherein the aminophenols (AP) are bis-amino(thio)phenol compounds of formula:

[structure: bis-phenyl compound with HE, EH, $H_2N$, $NH_2$ groups and bridge A]

wherein:
A is a bond, —$SO_2$—, —O—, —C(O)—, or a (fluoro)alkyl of 1 to 10 carbon atoms;
each of E, equal or different at each occurrence, is oxygen or sulphur, and wherein the amino and -EH groups are interchangeably in ortho, meta or para positions with respect to the group A; and
(A-2) amines (TA), wherein the amines (TA) are aromatic tetraamine compounds of formula:

[structure: bis-phenyl compound with $H_2N$, $NH_2$, $R_N$—NH, NH—$R_N$ groups and bridge A']

wherein:
A' is a bond, —$SO_2$—, —O—, —C(O)—, or a (fluoro)alkyl of 1 to 10 carbon atoms;
each of $R_N$, equal to or different from each other, is a hydrogen atom or a $C_1$-$C_{12}$ hydrocarbon group; and
the amino groups are interchangeably in ortho, meta or para positions with respect to the group A'.

2. The composition (C) of claim 1, wherein the aminophenol (AP) is selected from the group consisting of 4,4'-[2,2,2-trifluoro-1-(trifluoromethyl)-ethylidene]bis(2-aminophenol) and 4,4'-sulfonylbis(2-aminophenol); and/or wherein the amine (TA) is selected from the group consisting of 3,3'-diaminobenzidine, and 3,3',4,4'-tetraaminobenzophenone and a compound of formula:

[structure: bis-phenyl compound with $CF_3$ groups, $H_2N$, $NH_2$, and NH-phenyl groups]

3. The composition (C) according to claim 1, wherein the amount of the compound (A) in the composition (C) is at least 0.1 phr and/or at most 10 phr, relative to 100 weight parts of fluoroelastomer (A).

4. The composition (C) of claim 1, wherein the bis-olefin (OF) is selected from the group consisting of bis-olefins of formula (OF 1):
(OF-1)

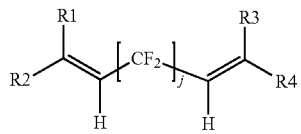

wherein j is an integer between 2 and 10, and $R_1$, $R_2$, $R_3$, $R_4$, equal or different from each other, are H, F or a $C_1$-5 alkyl or (per)fluoroalkyl group;
bis-olefins of formula (OF-2):
(OF-2)

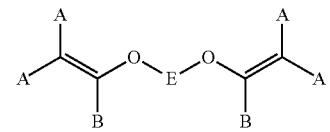

wherein each A, equal or different from each other and at each occurrence, is independently F, Cl, or H; each B, equal or different from each other and at each occurrence, is independently F, Cl, H or $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; and
bis-olefins of formula (OF-3):
(OF-3)

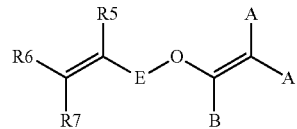

wherein E, A and B have the same meaning as above defined; $R_5$, $R_6$, $R_7$, equal or different from each other, are H, F or a $C_1$-5 alkyl or (per)fluoroalkyl group.

5. The composition (C) of claim 4, wherein the bis-olefin (OF) complies with formula: $CH_2=CH-(CF_2)_6-CH=CH_2$.

6. The composition (C) according to claim 1, wherein the amount of the bis-olefin (OF) in the composition (C) is at least 0.1 phr and/or at most 10 phr, relative to 100 weight parts of fluoroelastomer (A).

7. The composition of claim 1, wherein the fluoroelastomer (A) comprises recurring units derived from at least one (per)fluorinated monomer, in addition to the recurring units derived from the monomer (CSM), wherein said (per)fluorinated monomer is selected from the group consisting of:
$C_2$-$C_8$ fluoro- and/or perfluoroolefins;
$C_2$-$C_8$ hydrogenated monofluoroolefins;
1,2-difluoroethylene, vinylidene fluoride (VDF) and trifluoroethylene (TrFE);
(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
chloro- and/or bromo- and/or iodo-$C_2$-$C_6$ fluoroolefins;
fluoroalkylvinylethers complying with formula $CF_2=CFOR_{f1}$ in which $R_{f1}$ is a $C_1$-$C_6$ fluoro- or perfluoroalkyl;
hydrofluoroalkylvinylethers complying with formula $CH_2=CFOR_{f1}$ in which $R_{f1}$ is a $C_1$-$C_6$ fluoro- or perfluoroalkyl;
fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups;
functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form; and
(per)fluorodioxoles, of formula:

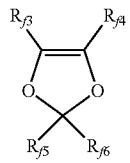

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom.

8. The composition (C) of claim 1, wherein the fluoroelastomer (A) is selected from:
(1) VDF-based copolymers, in which VDF is copolymerized with the monomer (CSM) and at least one additional comonomer selected from the group consisting of:
(a) $C_2$-$C_8$ perfluoroolefins;
(b) hydrogen-containing $C_2$-$C_8$ olefins;
(c) $C_2$-$C_8$ fluoroolefins comprising at least one of iodine, chlorine and bromine;
(d) (per)fluoroalkylvinylethers (PAVE) of formula $CF_2=CFOR_f$, wherein $R_f$ is a $C_1$-$C_6$ (per)fluoroalkyl group;
(e) (per)fluoro-oxy-alkylvinylethers of formula $CF_2=CFOX$, wherein X is a $C_1$-$C_{12}$
(f) (per)fluoro)-oxyalkyl comprising catenary oxygen atoms;
(f) (per)fluorodioxoles having formula:

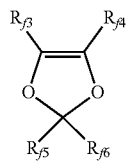

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom;

(g) (per)fluoro-methoxy-vinylethers having formula:

wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom;

(h) $C_2$-$C_8$ non-fluorinated olefins (OI); and (2) TFE-based copolymers, in which TFE is copolymerized with the monomer (CSM) and at least one additional comonomer selected from the group consisting of (c), (d), (e), (g), (h) and (i) as above detailed.

9. The composition (C) of claim 1, wherein the content of iodine and/or bromine in the fluoroelastomer (A) is at least 0.05% wt, with respect to the total weight of fluoroelastomer (A) and/or not exceeding 7% wt, with respect to the total weight of fluoroelastomer (A).

10. The composition (C) according to claim 1, wherein the fluoroelastomer (A) is selected from the group consisting of fluoroelastomers having terminal groups comprising iodine cure sites and having the following monomer composition (in mol %, with respect to the total moles of recurring units):
(i) tetrafluoroethylene (TFE): 50-80%; (per)fluoroalkyl-vinylethers (PAVE): 15 50%; monomer (CSM): 0.1-10%; bis-olefin (OF): 0-5%; or
(ii) tetrafluoroethylene (TFE): 20-70%; (per)fluoro-methoxy-vinylethers (MOVE): 25-75%; (per)fluoro-alkylvinylethers (PAVE): 0-50%; monomer (CSM) 0.1-10%; bis-olefin (OF): 0-5%.

11. The composition (C) of claim 1, wherein the peroxide (O) is selected from the group consisting of di(alkyl/alryl) peroxides; diacyl peroxides; percarboxylic acids and esters; and peroxycarbonates.

12. The composition of claim 1, wherein the amount of the peroxide (O) in the composition (C) is 0.1 to 5 phr, relative to 100 weight parts of fluoroelastomer (A).

13. A method for fabricating shaped articles comprising curing the composition (C), according to claim 1.

14. A cured article obtained from the composition (C) of claim 1, said cured article being selected from the group consisting of sealing articles, O(square)-rings, packings, gaskets, diaphragms, shaft seals, valve stem seals, piston rings, crankshaft seals, cam shaft seals, oil seals, piping, tubings, flexible hoses, and conduits for delivery of hydrocarbon fluids and fuels.

15. The composition (C) of claim 1, wherein:
A and A' are each independently a perfluoroalkyl of 1 to 10 carbon atoms;
each of E is oxygen; and
each $R_N$ is independently an aryl group.

16. The composition (C) according to claim 3, wherein the amount of the compound (A) in the composition (C) is at least 0.5 phr and at most 5 phr, relative to 100 weight parts of fluoroelastomer (A).

17. The composition (C) according to claim 6, wherein the amount of the bis-olefin (OF) in the composition (C) is at least 0.5 phr and at most 5 phr, relative to 100 weight parts of fluoroelastomer (A).

18. The composition (C) of claim 9, wherein the content of iodine and/or bromine in the fluoroelastomer (A) is at least 0.06% wt and not exceeding 4% wt, with respect to the total weight of fluoroelastomer (A).

19. The composition (C) of claim 11, wherein the peroxide (O) is selected from the group consisting of di-tert-butyl peroxide, 2,5-dimethyl-2,5-bis(tert-butylperoxy)hexane, di(t-butylperoxyisopropyl)benzene, dicumyl peroxide, dibenzoyl peroxide, disuccinic acid peroxide, di(4-methyl-benzoyl)peroxide, di(2,4-dichlorobenzoyl)peroxide, dilauroyl peroxide, decanoyl peroxide, di-tert-butyl perbenzoate, t-butylperoxy-2-ethylhexanoate, 1,1,3,3-tetramethylethyl-butyl peroxy-2-ethylhexanoate, 2,5-dimethyl-2,5-di(2-ethylhexanoylperoxy)hexane, di(4-t-butylcyclohexyl)peroxy-dicarbonate, di(2-phenoxyethyl)peroxydicarbonate, bis[1,3-dimethyl-3-(tert-butylperoxy)butyl]carbonate, t-hexylperoxyisoproprylcarbonate, and t-butylperoxyisopropylcarbonate.

20. The composition of claim 12, wherein the amount of the peroxide (O) in the composition (C) is 0.2 to 4 phr, relative to 100 weight parts of fluoroelastomer (A).

* * * * *